United States Patent Office 2,847,480
Patented Aug. 12, 1958

2,847,480

RECOVERING VOLATILIZED VALUES INCLUDING ETHANOL FROM WAREHOUSE ATMOSPHERES

Ralph R. Kaiser, Cincinnati, Ohio, assignor to National Distillers and Chemical Corporation, New York, N. Y., a corporation of Virginia No Drawing. Application February 21, 1955
Serial No. 489,781

2 Claims. (Cl. 260—643)

This invention relates to the recovery of volatilized values, including particularly ethyl alcohol, which are normally lost from whiskey during the aging in wooden barrels.

Whiskey is customarily aged in oak barrels which are stored in warehouses for periods of four years or more and, during such aging periods, a very considerable loss of volatile material, chiefly ethyl alcohol, normally occurs by vaporization through the wood of the barrels. Such losses amount to an approximate average of about two proof gallons per year per barrel for the first 4 to 5 years of storage. Hence, as a standard whiskey barrel holds approximately 50 gallons, such losses average about 20 percent of the original contents per barrel over a five-year period. Since the warehouses in which whiskey barrels are stored are normally well ventilated, the very substantial volatilized values are lost to the surrounding atmosphere.

It is an object of this invention to recover volatilized alcohol by efficient and economical means.

It is a further object of this invention to recover substantially all of the volatilized values, including ethyl alcohol normally lost from whiskey during aging in wooden barrels, in such a manner as to permit further use of the recovered ethyl alcohol with a minimum of subsequent treatment.

These objects, and others which will hereinafter become evident, are accomplished according to this invention by passing the atmosphere surrounding the barrels and containing a suitable proportion of alcohol vapors into contact with an adsorption agent, a suitable illustrative example of which is activated carbon, as well as silica gel and other adsorbents for alcohol vapors. The vapors which are thus removed from the enriched air by the adsorption agent are subsequently recovered substantially completely by practice of this invention. These steps must be carried out under controlled conditions, and the entire operation performed in an integrated manner, in order to achieve the highly efficient recovery of volatilized values made possible by practice of the invention as is discussed more fully hereinafter.

The recovery of alcohol by the process of this invention is highly practical and economical when the degree of ventilation within the warehouse is suitably controlled and certain other critical factors are regulated. Of such factors, the rate and control of the air removal from the warehouse have been found to be critical for the effective recovery of alcohol. For example, it has been found that, with a warehouse section having a total volume of 443,500 cubic feet and a free volume of 317,500 cubic feet and containing 15,000 barrels, the removal of the contained atmosphere at rates of 370 and 760 S. C. F. M. (standard cubic feet per minute) resulted in a satisfactory constant alcoholic concentration in the atmosphere for its effective recovery by the process of this invention; whereas at a lower rate of air withdrawal (e. g., 252 C. F. M.), alcohol recovery was reduced to 80% of that obtained when the air was removed at 370 S. C. F. M.

Thus, in order to recover the alcohol from the atmosphere in an economical manner, the air must be removed at a sufficiently high rate to prevent substantial amounts of the alcohol from diffusing through the walls and minor openings of the building. Preferably, however, the rate of air removal should not be of such high magnitude that the cost of the power required to operate the fan, pump, or other air removal equipment, will render the process uneconomical.

In order that the vapors from which the volatilized values are to be recovered may not be unduly diluted with air, all sizable openings into the warehouse should be closed. It is not necessary, however, that the walls be made air tight although this may be desirable, in which case a controlled air inlet duct should be employed. Good results have been achieved in warehouses in which doors, windows, ventilators, floor drains and other sizable openings have been tightly closed. Under such conditions, sufficient air normally enters the warehouse through fine openings and permits effective operation of the process of this invention.

Under such closed warehouse conditions, and with controlled withdrawal of the atmosphere therefrom, the alcoholic content of the atmosphere will remain at a substantially constant level and particularly suitable results are obtained by practice of this invention when the alcoholic content of the atmosphere is maintained within the range of about 0.34 to about 0.70 lb. per M. S. C. F. (thousand standard cubic feet). Since the rate of evaporation of alcohol from the barrel varies with the temperature, it may be expected that the alcoholic content will vary somewhat from the above range over an annual period. As an illustrative but not limitative example of operating conditions suitable for practice of the invention, an exhaust rate of 1.16 S. C. F. M. to 2.39 S. C. F. M. per thousand cubic feet of free volume in a filled warehouse generally produces satisfactory results.

Thus, certain features of the invention are as follows:

(1) Openings in the warehouse should be restricted to the extent that there will be an inward movement of air through the pores of the warehouse walls when air is removed at an economical rate, such as by a fan or an air pump, from the warehouse.

(2) The alcohol-containing air should be removed from the warehouse to the recovery apparatus at a rate such that a high concentration of alcohol is retained in the warehouse atmosphere and, at the same time, the enriched warehouse atmosphere should not be permitted to diffuse to the outside atmosphere through the walls and uncontrolled openings of the building.

The aforesaid features are best utilized by carrying out the following steps which constitute actual operations:

(1) The warehouse should be sufficiently sealed in order to bring the alcohol in the air to a concentration at which it can be efficiently removed. This is best accomplished by closing all sizable openings and, if desired, can also include careful caulking, sealing of cracks, coating or spraying masonry and other structural materials to insure less permeability, and the use of other precautions to minimize losses.

(2) Air should be withdrawn at a rate such that the desired minimum concentration of alcohol is maintained while simultaneously maintaining sufficient exit flow to prevent a substantial, if any, amount of alcohol leaving the building through unsealed cracks, porous walls, ceilings and floors.

(3) The alcohol and any other volatiles in the withdrawn air are trapped, preferably by passage of the air stream over an adsorbent such as activated carbon, by adsorption of the volatiles thereon.

(4) The alcohol so trapped is subsequently recovered by an appropriate method.

(5) If desired, the recovered alcohol is concentrated and refined by distillation, chemical treatment, and/or such other methods as may be desired.

The following example illustrates one method of successfully carrying out the process of the invention, although it is in no way intended to limit the invention specifically thereto.

EXAMPLE

This test utilized one floor of a plant size whiskey storage warehouse having a total volume of 443,500 cubic feet and containing 15,000 barrels of aging whiskey having a calculated volume of 126,000 cubic feet. All major openings in the warehouse were closed, floor drains and ventilators were sealed, and doors and windows were caulked and weatherstripped.

Air was exhausted from the warehouse through a 5 inch duct by means of a 500 cubic feet per minute blower, and four circulating fans were employed to keep the atmosphere within the floor well-mixed. The rate of air withdrawal was measured by a pilot tube connected to a spiral manometer. Most of the air was exhausted to the atmosphere but a measured amount of the exhaust from the blower was passed through the adsorption unit. For this purpose, a 6 cubic feet per minute blower was used and the rate of flow through the carbon bed was maintained at about 1.43 cubic feet per minute by means of a flow meter and a by-pass line. For exhaust rates of 760 S. C. F. M., a larger blower and an 8 inch duct were utilized.

Pelleted Columbia activated carbon for the adsorption was contained in a removable cylinder, 2 inches in diameter by about 30 inches in length, surrounded by a steam jacket for use during the steaming cycles. Vapor laden air entered the top of the column, passed through the carbon bed and was vented to the atmosphere. During the desorption cycle, steam was passed downward through the jacket surrounding the cylinder, then upward through the carbon bed, and then to a condenser. A valve on the condenser maintained a back pressure of 15 p. s. i. g. on the column and gave, with a 20 minute steaming cycle, a condensate having a water-alcohol ratio of approximately 3 to 1 by volume.

The adsorption and desorption cycles were maintained at approximately 160 and 20 minutes, respectively.

The alcoholic content of the atmosphere was determined by absorption of the alcohol from a known volume of air by means of anhydrous magnesium perchlorate with subsequent recovery by distillation and analysis by oxidation with potassium dichromate and sulfuric acid solution. A mine safety appliance combustible gas indicator, previously calibrated with ethyl alcohol, was also used and found to give results within 3% of those obtained by the perchlorate method.

The data obtained in this test are shown in Table I.

exhaust rate of 760 S. C. F. M., the recovery was equivalent to 114 proof gallons per day, for the warehouse space involved.

The condensate containing the desorbed alcohol was approximately 50 proof. An analysis of the condensate, calculated to a strength of 50 proof gave the following results:

| | G./100 liters |
|---|---|
| Acids (as acetic) | 4.3 |
| Esters (as ethyl acetate) | 42 |
| Aldehydes (as acetaldehyde) | 9.1 |
| Fusel oil | 40 |

A portion of the condensate was fractionally distilled, eliminating a 10% heads cut and a 5% tails cut. The middle run analyzed as follows:

| | | |
|---|---|---|
| Proof | | 192.1 |
| Acids (as acetic acid) | g./100 liters | 1.8 |
| Esters (as ethyl acetate) | g./100 liters | 2.6 |
| Aldehydes (as acetaldehyde) | g./100 liters | 0.7 |

As is apparent from the foregoing, practice of the invention in the controlled manner aforedescribed provides for effective recovery of alcohol which, in condensate form, is of such quality that it is useful for many of the purposes for which ethanol is employed, including usage as an industrial alcohol. As is also shown by the data herein, practice of the invention may be carried out to the extent that all, or substantially all, of the alcohol available for adsorption is recovered and, by actual tests, the alcohol recovered in condensate form as aforedescribed possessed suitable odor and taste characteristics.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for recovering volatilized values including ethyl alcohol normally lost from warehouses during the aging of whiskey which comprises the steps in combination of controlling the ethyl alcohol content of the atmosphere within the warehouse to not less than a minimum concentration level of about 0.34 lb. per M. S. C. F. of ethyl alcohol and maintaining said concentration level within the range of about 0.34 to 0.70 lb. per M. S. C. F., exhausting the alcohol-enriched atmosphere from the warehouse at a rate of from 1.16 to 2.39 S. C. F. M. per M. S. C. F. of free warehouse volume and controlling said exhaust at a rate not greater than about 2.39 S. C. F. M. per M. S. C. F. of free warehouse volume such as to maintain at least said minimum concentration level of ethyl alcohol within said warehouse, passing said exhausted atmosphere over an adsorbent whereby the volatile values including ethyl alcohol are adsorbed thereon and thereafter recovering said volatile values including ethyl alcohol therefrom.

2. A process for recovering ethyl alcohol normally lost

Table I

| Exhaust Rate, S. C. F. M. | Carbon Adsorber Cycle, Minutes | No. of Cycles | Alcohol in Atmosphere, Average, gm./cu. ft. | Rate Air over Carbon Adsorber, C. F. M. | Alcohol Available for Adsorption, gm. | Condensate from Steaming the Adsorber | | Percent Alcohol Recovered |
|---|---|---|---|---|---|---|---|---|
| | | | | | | cc. | gm. alcohol | |
| 372 | 165 | 7 | 0.240 | 1.43 | 396 | 1,785 | 412 | 104 |
| 373 | 160 | 8 | 0.240 | 1.43 | 438 | 2,305 | 392 | 90 |
| | 160 | 7 | 0.230 | 1.43 | 368 | 2,060 | 320 | 87 |
| | 160 | 24 | 0.260 | 1.43 | 1,425 | 5,340 | 1,317 | 93 |
| 370 | 160 | 7 | 0.269 | 1.43 | 431 | 2,100 | 394 | 92 |
| 370 | 160 | 8 | 0.247 | 1.43 | 475 | 2,300 | 465 | 98 |
| 760 | 240 | 1 | 0.163 | 1.51 | 59.5 | 468 | 61 | 102 |
| 760 | 313 | 1 | 0.149 | 1.43 | 66.7 | 330 | 61 | 91 |

The average recovery of alcohol was 93.5%. At the exhaust rate of 370 S. C. F. M., the recovery of alcohol was equivalent to 98 proof gallons per day; and at the from warehouses during the aging of whiskey which comprises the steps in combination of controlling the ethyl alcohol content of the atmosphere within the warehouse to not less than a minimum concentration level of about 0.34 lb. per M. S. C. F. of ethyl alcohol and maintaining said concentration level within the range of about 0.34 to 0.70 lb. per M. S. C. F., exhausting the alcohol-containing atmosphere from the warehouse at a rate of from 1.16 to 2.39 S. C. F. M. per M. S. C. F. of free warehouse volume and controlling said exhaust at a rate not greater than about 2.39 S. C. F. M. per M. S. C. F. of free warehouse volume such as to maintain at least said minimum concentration level of ethyl alcohol within said warehouse, passing said exhausted atmosphere over an activated carbon adsorbent whereby the ethyl alcohol is adsorbed thereon, and thereafter desorbing and recovering said ethyl alcohol therefrom.

References Cited in the file of this patent

UNITED STATES PATENTS 2,211,162    Ray et al. _____ Feb. 5, 1938

OTHER REFERENCES

Mantell: Adsorption (2nd edit., 1951), McGraw-Hill, New York, page 254, pages 231–7, 239, and chapter 12.